May 25, 1965
E. J. M. DARDAINE ETAL
3,185,328
MACHINE FOR HANDLING OBJECTS
Filed June 26, 1962
6 Sheets-Sheet 3
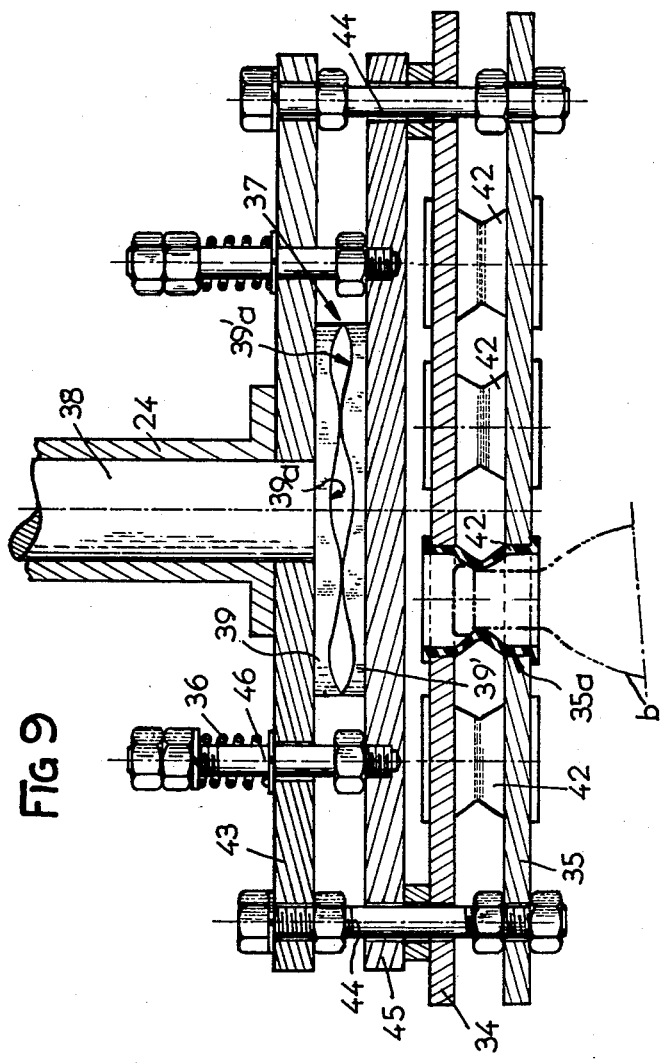
Inventors:
Edgard, Jean Marcel
Dardaine
René Malibeaux
BY Nolte & Nolte
Attorneys May 25, 1965     E. J. M. DARDAINE ETAL     3,185,328
MACHINE FOR HANDLING OBJECTS
Filed June 26, 1962                                           6 Sheets-Sheet 4
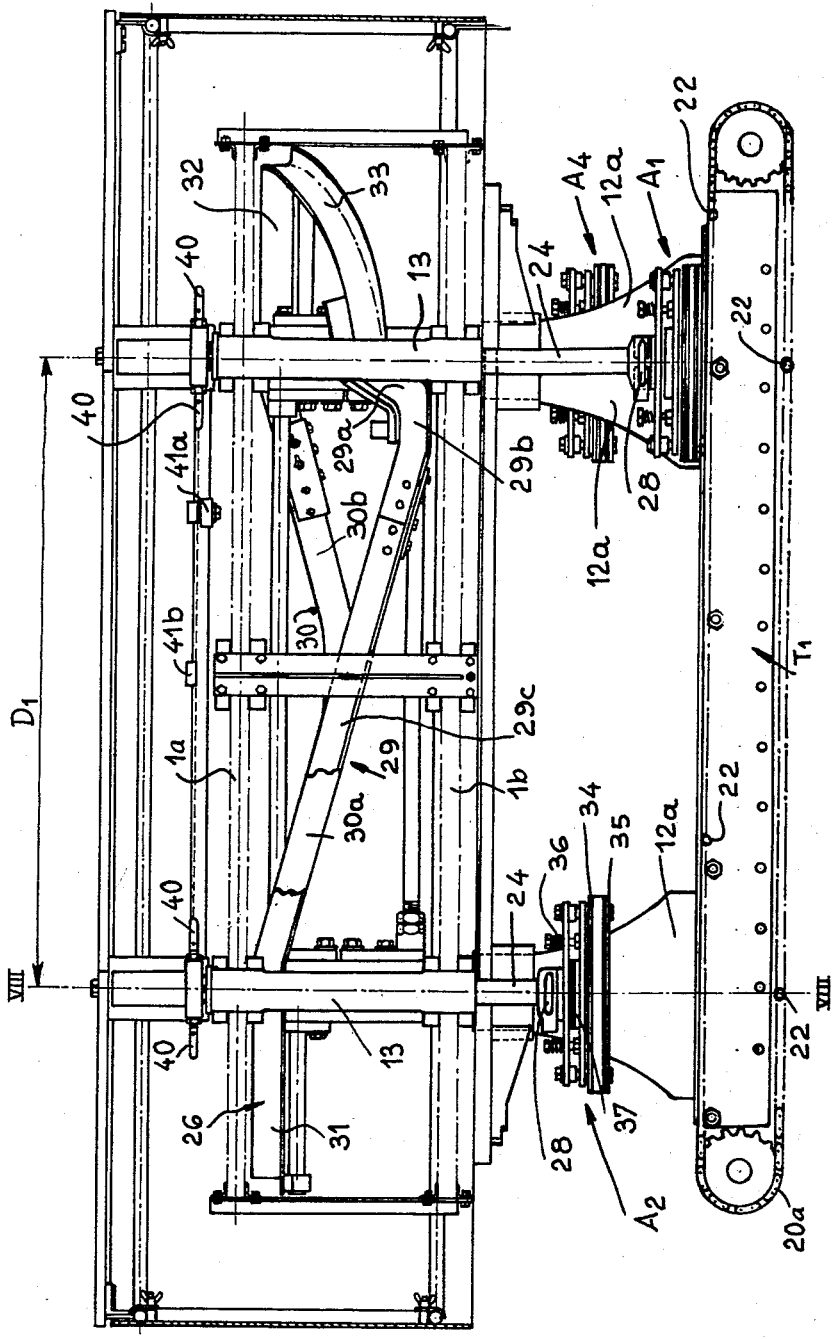

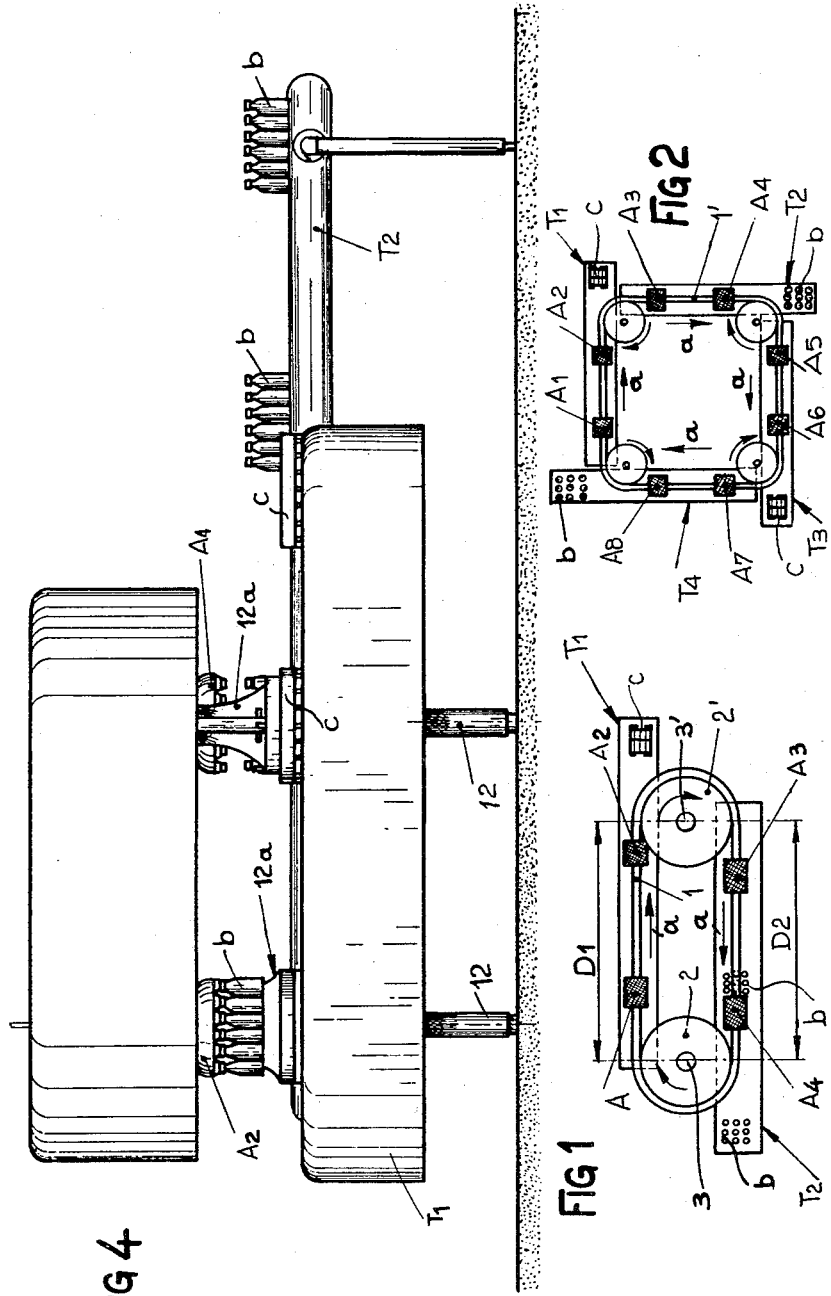

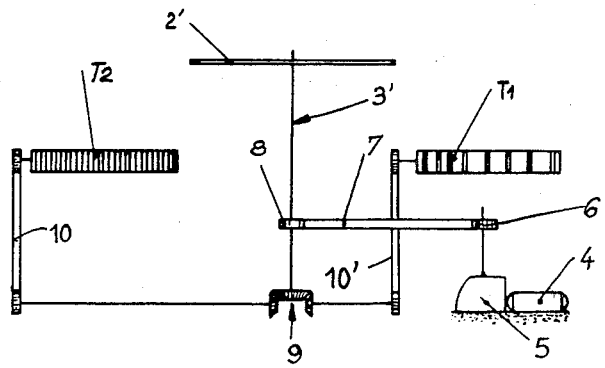
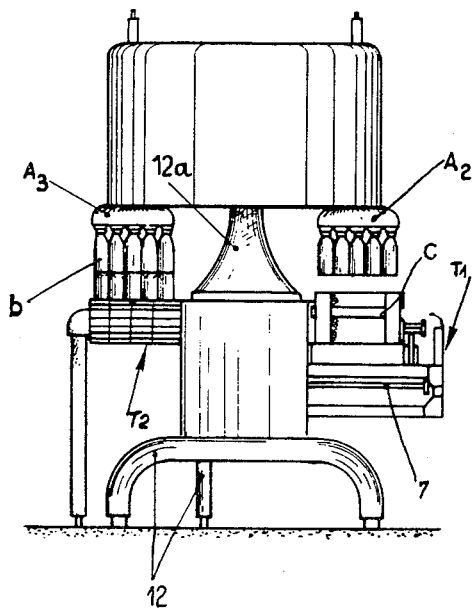

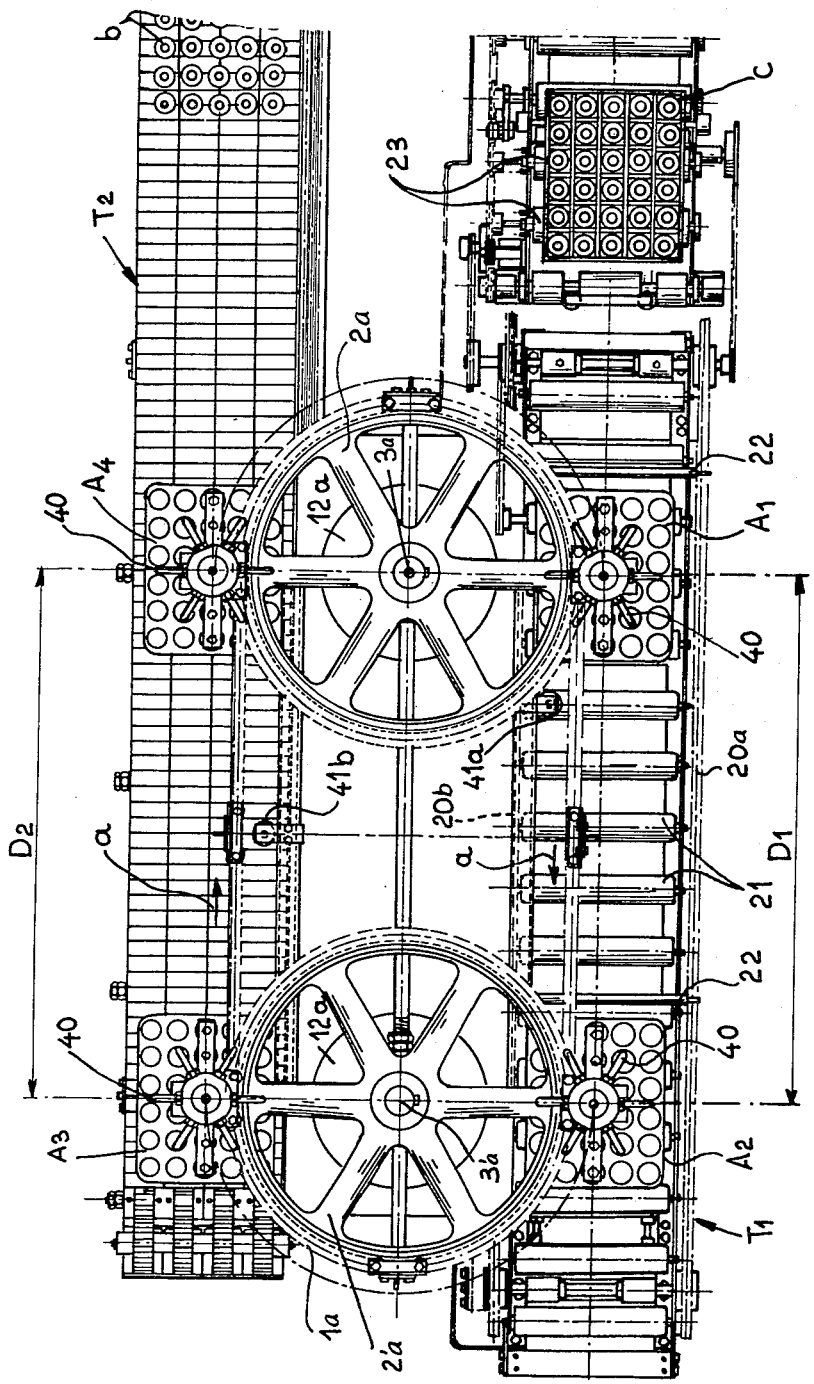

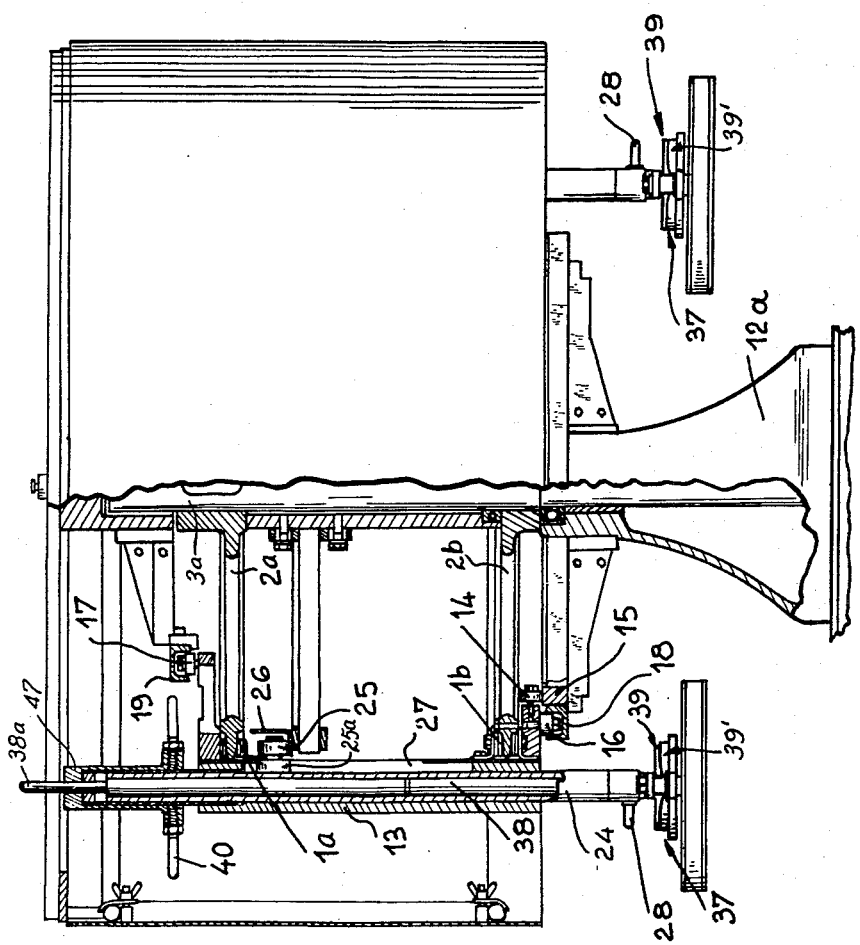

United States Patent Office 3,185,328
Patented May 25, 1965

3,185,328
MACHINE FOR HANDLING OBJECTS
Edgard Jean Marcel Dardaine, Poissy, and René Malibeaux, Paris, France, assignors to E. P. Remy & Cie., Poissy, France, a corporation of France
Filed June 26, 1962, Ser. No. 205,403
Claims priority, application France, June 24, 1957, 741,619; Jan. 24, 1958, 756,671
3 Claims. (Cl. 214—309)

This application is a continuation-in-part of Serial No. 736,886, filed May 21, 1958, now abandoned.

This invention relates to machines for handling miscellaneous articles or objects, such as bottles, boxes, machine parts and the like for uncasing and possibly casing them.

The various known types of machines or plants utilized for uncasing bottles comprise one or more sets of gripping heads mounted on movable carriers overlying at least two conveyors, the one being adapted, for example, to bring the cases with the bottles beneath said gripping heads, and the other to remove the uncased bottles. The gripping heads are adapted to grip all the bottles in the cases brought by the first conveyor as said cases travel past said gripping heads, and subsequently to deposit said bottles on the other conveyor.

As a rule, the movable carriers supporting the gripping heads are fitted either on pivotally mounted or hinged arms moving to and fro between the two conveyors so as to take the bottles carried in the cases brought by the first conveyor and deposit them on the other conveyor, or they are carried by a pivoting or rotating tray or plate overlying the ends of the two conveyors.

The assembly of both types of these known machines is characterized by the serious inconvenience that none of them is capable of ensuring a perfect synchronism between the movement of the gripping heads and that of the conveyors.

Thus, in machines pertaining to the first type mentioned hereinabove, the operation is attended by a series of discontinuous steps requiring, for example, the momentary stoppage of the conveyors when the gripping heads overlie the bottles to be uncased, and again when the same gripping heads are about to deposit the bottles on the other conveyor.

In the case of machines pertaining to the second type mentioned hereabove, a serious inconvenience lies in the fact that the gripping heads carried by the pivoting or rotating tray do not travel along paths parallel to those of the rectilinear conveyor tracks. Thus, the heads will operate satisfactorily only with cases or bottle crates having well-defined, preferably reduced dimensions, so as to limit as much as possible the distance between the gripping heads located near the outer periphery of the carrying tray and those in the central region thereof, thus reducing to a minimum the speed discrepancy between the gripping heads. Under these conditions, it is evident that the field of applications of these machines is greatly reduced.

Transfer machines are already known which comprise two conveyors travelling in opposite directions and a device for transferring articles from one of said conveyors to the other. The transfer device includes endless transfer chains passing over driving horizontal pulleys and driven horizontal pulleys. The transfer chains have two rectilinear sections parallel to the conveyors and are driven in synchronism with said conveyors. The transfer chains carry head brackets provided with gripping elements for picking up an article from a cradle on one of said conveyors and for transporting the gripped article in a cradle on the other of said conveyors. This arrangement ensures the synchronism of the transfer operation, but the articles to be transferred must be previously and manually positioned on each one of said cradles. Machines of this type are not suitable for loading or unloading of cases with objects.

Now it is the essential object of this invention to provide an improved machine of the type broadly set forth hereinabove whereby the various inconveniences are avoided.

This machine comprises one or more sets of gripping heads mounted on movable carriers overlying at least two travelling conveyors, said movable carriers being continuously driven along an endless guiding path having at least two separate rectilinear sections, said travelling conveyors being disposed beneath each of said rectilinear sections. The movable carriers and said conveyors are imparted the same linear speed along and in a path parallel to said rectilinear sections. The movements effected by said gripping heads for depositing and removing the articles are synchronized with respect to the displacement of said movable carriers along their guiding paths, whereby said movements effected by the gripping heads take place when said movable carriers travel along said rectilinear sections.

Means are also provided for spacedly positioning and entraining the cases on the conveyor carrying said cases, so that each case will automatically and exactly plumb with a gripping head.

Thus, with the machine of this invention the uncasing of bottles will take place in a reliable and simple manner since the different movements accomplished by the gripping heads take place only along rectilinear sections of their guiding paths, the cases or bottles brought in or delivered by the conveyors travelling at the same time exactly beneath these gripping heads.

Other features and advantages of this invention will become apparent as the following description proceeds with reference to the accompanying drawings forming part of this specification and illustrating schematically by way of example, a few embodiments of a machine or installation constructed according to the teachings of this invention.

In the drawings:

FIGURE 1 is a diagram illustrating the principle of operation of a machine according to this invention, for uncasing bottles or other objects;

FIGURE 2 illustrates diagrammatically the principle of operation of a machine constituting a modified embodiment of the arrangement shown in FIGURE 1;

FIGURE 3 illustrates schematically the driving means of the conveyors and gripping heads of the machine;

FIGURE 4 is an elevational view showing a bottle uncasing machine constructed according to the principle illustrated in FIGURE 1;

FIGURE 5 is a side view of the machine taken from the left-hand side of FIGURE 4;

FIGURE 6 is a partial view showing on a larger scale the machine illustrated in FIGURE 4 with the hood removed;

FIGURE 7 is a top plan view of the machine illustrated in FIGURE 6 with the hood removed;

FIGURE 8 is a side view of the machine illustrated in FIGURE 6 with a half section taken substantially along the line VIII—VIII in said FIGURE 8 and with parts broken away;

FIGURE 9 is a sectional view of a gripping head.

Referring first to the embodiment illustrated in FIGURE 1, the machine includes a series or set of gripping heads, denoted $A_1$, $A_2$, $A_3$ and $A_4$ and adapted to grip simultaneously a group of objects, for example bottles $b$ from cases or crates $c$ to be uncased. The gripping heads are mounted on an endless band 1 passing, for example, over a pair of horizontal pulleys 2, 2' rotating about axes 3, 3' and so spaced from each other as to cause the gripping heads $A_1$, $A_2$, $A_3$, $A_4$ to move along a closed path so designed as to comprise at least two separate rectilinear sections illustrated schematically at $D_1$ and $D_2$. Beneath and parallel to the two rectilinear spans of the band 1 are arranged conveyors $T_1$, $T_2$, respectively. At least one of the pulleys is a driving pulley and its rotation causes the band 1 to travel in the direction shown by arrows $a$ and with a uniform and continuous motion, the supporting surfaces of the conveyors $T_1$ and $T_2$ travelling on the other hand in the same direction as shown by the arrows and at the same speed as the rectilinear spans of the band 1 which they underlie, as shown in the figures.

As the conveyor $T_1$ is adapted, for example, to feed the machine with bottle-containing cases $c$, the other conveyor $T_2$ being adapted in this case to carry off or deliver the bottles $b$ removed from the cases, the bottle-uncasing and casing movements accomplished by the gripping heads $A_1$, $A_2$, $A_3$ and $A_4$ are synchronized with the motion of the band 1, so that the bottle-uncasing and depositing operations take place when the gripping heads travel along the two rectilinear sections $D_1$ and $D_2$.

Preferably, the gripping heads are disposed at spaced intervals along the band 1 so that, immediately as one gripping head $A_2$ is about to complete its travel along the rectilinear section $D_1$, the following gripping head $A_1$ begins its travel along the same rectilinear section $D_1$ and is ready to uncase the bottles from another case. The same applies to the depositing of bottles along the other rectilinear section $D_2$ over which gripping head $A_3$ is in a position in which it is ready to deposit the bottles previously taken from the conveyor section $T_1$, together with another gripping head $A_4$ having completed its bottle-depositing operation.

As a rule, the principle set forth hereinabove and whereby the operations are affected by gripping heads along rectilinear sections of the path of these gripping heads in directions parallel to and at the same speed as the travel of the conveyors associated therewith, is also applicable to a greater number of conveyors, for example, as illustrated diagrammatically in FIGURE 2.

In this figure, it is clear that to an endless band 1' following a closed path and entraining a series of gripping heads $A_1$, $A_2$, $A_3$, . . . $A_8$, there are associated four conveyors $T_1$, $T_2$, $T_3$, $T_4$ of which conveyors $T_1$ and $T_3$ are adapted to transport bottle-filled cases $c$ during the uncasing operation, whilst the other conveyors $T_2$ and $T_4$ are operated simultaneously for delivering the uncased bottles $b$.

In FIGURE 2 of the drawings too, the arrows $a$ indicate the direction in which the conveyors are driven.

FIGURE 3 illustrates only very schematically a simple form of embodiment of a mechanism for driving in synchronism, and at the same speed the driving pulley 2' and the conveyors $T_1$ and $T_2$. A common motor 4 drives, through a reduction gear 5, on the one hand, the pulley 2' by means of a pinion 6 carried by the output shaft of the reduction gear, this pinion 6 being connected through a chain or like transmission member 7 to another pinion 8 keyed on the axis 3' of this pulley 2'. On the other hand, the motor 4 drives the conveyors $T_1$ and $T_2$ through the medium of bevel gears 9 linked to the axis 3' and a pair of pinion and chain transmission 10, 10'.

FIGURES 4 to 8 of the drawings illustrate in more detail a bottle-uncasing machine constructed according to the principle shown diagrammatically in FIGURE 1.

The conveyors $T_1$ and $T_2$ are reversed in FIGURES 4 to 8 with respect to the schematic showing of FIGURE 1 between the front and rear machine portions. For a better illustration, the machine hood has been removed in FIGURES 6, 7 and partly broken away in FIGURE 8.

The machine comprises a frame 12 supporting on the one hand two conveyors $T_1$ and $T_2$ disposed laterally and, on the other hand, a pair of central pillars 12a. Each pillar 12a supports a pair of horizontally disposed but vertically spaced sprocket wheels, 2a, 2'a; 2b, 2'b. Sprocket wheels 2a, 2b are mounted on a shaft 3a whereas sprocket wheels 2'a, 2'b, are mounted on a shaft 3'a. A pair of horizontally disposed but vertically spaced transfer chains 1a, 1b passes over the sprocket wheels 2a, 2'a and 2b, 2'b respectively. Said sprocket wheels and chains are shown in dotted lines on FIGURES 6 and 7, and in full lines on FIGURE 8.

The transfer chains 1a, 1b carry four identical movable carriers 13 uniformly arranged on said chains and bridging the space between the two chains, each one of said carriers supporting one of the gripping heads $A_1$, $A_2$, $A_3$, $A_4$. The relative spacing of shafts 3a, 3'a of these pulleys determines the length of the rectilinear sections $D_1$, $D_2$ along which the bottle-uncasing and depositing operations take place.

Each carrier 13 consists of a tubular member secured to the transfer chains 1a and 1b and is provided at its lower end with one travelling-wheel 14 adapted to run on a rail 15, located below the lower transfer chain 1b and serving as a track for supporting the carriers. Each carrier 13 is further provided at its upper and lower ends with guide runners 16, 17 operating in guide runways 18, 19 respectively (see FIGURE 8).

The conveyor $T_2$ is an apron conveyor the carrying surface of which travels at the same linear speed as the endless band or chain 1.

On the other hand, the conveyor $T_1$ may be a stationary roller conveyor having associated therewith a pair of endless sprocket chains 20a, 20b disposed laterally in either side of rollers 21 and having fitted therebetween a series of spaced transverse bars 22 adapted to carry along the bottle-filled cases $c$ beneath the gripping heads. These cases $c$ are fed to the conveyor $T_1$ by means of a series of driven rollers 23. Each case is driven by said rollers 23 until it arrives on the conveyor rollers 21, it is then driven by one of the transverse bars 22. The endless sprocket chains 20a, 20b are also driven with the same linear speed as the endless transfer chains 1a, 1b and the positions of the transverse bars 22 are determined in synchronism with the displacement of the movable carriers 13 supporting the gripping heads, so that each case $c$ when carried along on the conveyor $T_1$ by a transverse bar 22, will be automatically and exactly plumb with a gripping head.

For synchronizing the gripping and depositing movements accomplished by the gripping heads with the displacement of the carriers, means are provided as described hereinafter:

As shown in FIGURES 6 and 8 each gripping head $A_1$, $A_2$, $A_3$, $A_4$, is secured to the lower end of a hollow rod 24 slidably and rotatably mounted within each carrier 13. Said rod 24 is slidably mounted with soft friction so as to move down by gravity. On each rod 24 is secured a support 25a provided with a roller 25 adapted to run on a lifting ramp 26 disposed between the chains 1a and 1b and having in section the shape of an L (see FIGURE 8). Of course, said roller prevents the rod 24 to slide down. A slot 27 is provided in each carrier 13 in order to permit the sliding motion of the support 25a of the rollers 25. Preferably the hollow rods 24 are provided with handles 28 for manually lifting the gripping heads if necessary.

The ramp 26 follows the straight portions of the chains 1a, 1b and curves around the pulleys 2a, 2b and 2'a, 2'b for providing a path of travel of rollers 25 similar to the path of travel of the carriers 13. For this purpose, the ramp 26 comprises a first straight portion 29 and a second straight portion 30, a half-circular portion 31 disposed horizontally and connecting said first straight portion to said second straight portion, a quarter-round shaped portion 32 also disposed horizontally and finally a helical portion 33 which assures the gradual transition between the quarter-round shaped portion 32 and the first straight portion 29.

The first straight ramp portion 29 which overlies the conveyor $T_1$, slopes down along a relatively short path, as shown at 29a, extends horizontally as shown at 29b, and then slopes upwardly along a relatively long path, as shown at 29c.

The second straight ramp portion 30 which overlies the conveyor $T_2$ slopes down gradually along about the half of its path as shown at 30a and then slopes upwardly as shown at 30b.

When the transfer chains 1a, 1b, the sprocket chains 2a, 2b and the conveyor $T_2$ are travelling in the direction of the arrows a (see FIGURE 7) each roller 25 travels along the ramp 26 and consequently it controls the sliding movement of the hollow rod 24 and consequently the vertical displacement of the gripping head.

The gripping heads comprise a plurality of resilient grippers adapted to receive the necks of the bottles b as shown in FIGURE 9. Said grippers consist of rubber or plastic rings 42 having the shape of V-grooved pulleys, and mounted between two parallel plates 34, 35 superposed and adapted to move toward and away from each other. These rings overlie corresponding orifices 35a formed in the lower plate 35 and adapted to fit over a corresponding number of bottle necks. The lower plate 35 is fastened to a support member 43 by means of struts 44 which support member is secured to the lower end of the hollow rod 24. The upper plate 34 is fastened to a holder 45 slidably fitted on said struts and submitted to the action of springs 36 which move it toward the support member 43 by means of tie-rods 46 secured to said holder and passing through said support member. It is evident that the displacement of the upper plate 34 toward the lower plate 35 against the action of the springs 36, causes the rings 42 to clamp the bottle necks.

The movement of the upper plate 34 toward the lower plate 35 is obtained by means of a locking device 37 disposed between the support member 43 and the holder 45. Said locking device comprises two identical and superposed cam members 39, 39'. The lower cam member 39' is solid with the holder 45 and formed with a sinusoidal upper edge 39'a and the upper cam member 39 is rotatably mounted on and adapted to slide in relation to the lower member 39', the upper member 39 being formed likewise with a sinusoidal edge 39a.

The rotation of the cam member 39 with respect to the cam member 39' causes said members to move toward and away from each other according to the relative position of the edges 39a, 39'a. Of course, the maximum displacement of the members 39, 39' is equal to the amplitude of the sinusoids. FIGURE 9 shows the gripping head in the clamping position, the swells of one cam member registering with the swells of the other cam member.

A rod 38 rotatably mounted within the hollow rod 24 controls the actuation of the locking device 37 and consequently the clamping and releasing operations of the gripping heads in synchronism with respect to the displacement of the movable carriers 13.

For this purpose the lower end of the rod 38 is secured to the rotatable cam member 39 of the locking device. A sleeve member 47 rotatably mounted on the carrier 13 at the upper end thereof, engages an extension 38a of the rod 38. The sleeve member 47 is provided to drive the extension 38a in rotation while permitting vertical movement of the same. The sleeve member carries a plurality of radially extending pins 40 adapted to engage fixed abutment means 41a, 41b; when the gripping heads travel along the rectilinear sections $D_1$ or $D_2$. Of course, the number of pins 40 on the sleeve member corresponds to the pitch of the sinusoids provided on the cam members 39, 39'. In the example selected, each sleeve member carries six pins and the opening or the closing of the grippers is effected by a rotation of 60° of the locking device.

In order to ensure the synchronism between the movements of the carriers 13 and the actuation of the grippers of the gripping heads $A_1, A_2, A_3, A_4$, the abutment means 41a and 41b are so located that they are registering in substantially vertical relationship with the lower section of the straight portions 29 and 30 respectively of the ramp 26.

The device described hereinabove operates very simply as follows:

Assuming that the machine is utilized for uncasing bottles from cases and considering the movement of the device from the moment when a roller 25 runs along the helical portion 33 of the ramp 26, the corresponding gripping head gradually moves down onto a case c travelling along the conveyor $T_1$ at the same linear speed as the gripping head itself. As soon as the roller 25 reaches the section 29a of the straight ramp portion 29, the gripping head is suddenly lowered so that the grippers engage the necks of the bottles, the gripping head remains in this lowered position as long as the roller 25 runs along the horizontal portion 29b of the ramp. At the moment when the roller 25 leaves the horizontal portion 29b one of the pins 40 meets the abutment means 41a and this causes the rotation of the cam member 39 which causes the grippers to clamp the necks of the bottles. The roller 25 continuing its motion along the first straight portion 29 of the ramp, the gripping head is gradually raised until the roller reaches the half circular portion 31. The roller 25 leaves the circular portion 31 and runs along 30a so that the gripping head is gradually lowered until the roller reaches the lower end of the second straight ramp portion 30. At this moment one of the pins 40 meets the abutment means 41b and causes the grippers to release the bottles. The bottles having been deposited on the conveyor $T_2$, the gripping head is raised again until the roller reaches the quarter-round shaped portion 32, then the gripping head terminates its cycle of operation and immediately proceeds through another cycle as just described.

Of course, without departing from the principle of this invention, many modifications may be brought to the embodiment illustrated and described herein, for example the sets of gripping-heads may be driven along an endless path comprising a greater number of rectilinear sections than those illustrated, in combination with a corresponding number of conveyors.

What we claim is:

1. A machine for handling miscellaneous objects by selectively loading said objects into and unloading the same from cases comprising at least one stationary roller conveyor; at least one pair of endless sprocket chains disposed on either side of said roller conveyor and travelling in a determined direction at a constant linear speed; a plurality of spaced transverse bars fitted between said chains and adapted to convey said cases; at least one further coveyor provided for the transport of said objects parallel to said roller conveyor and travelling in the opposite direction at the same constant speed as said sprocket chains; a plurality of movable carriers provided with travelling wheels and driven by a pair of horizontally disposed and vertically spaced endless transfer chains passing around a pair of horizontal driving pulleys and a pair of horizontal driven pulleys, said transfer chains travelling with the same constant speed as said sprocket chains and having at least two rectilinear track sections parallel to and overlying said conveyors; a rail for supporting said travelling wheels, said rail being located below said transfer chains; a plurality of gripping heads, slidably mounted on said carriers and provided with guide rollers, said gripping heads comprising resilient grippers mounted between an upper and a lower plate movable with respect to each other, said grippers being adapted to grip and lift said objects while travelling along one of said rectilinear sections and to deposit and release said objects while travelling along the other of said sections; an L-shaped ramp located between said transfer chains and having at least two straight portions curving downwardly and upwardly so as to present lower sections, said ramp serving as a track for guiding said guide rollers and controlling the sliding motion of said gripping heads in synchronism with the motion of said transfer chains; actuating means for causing said gripping heads to grip or to release said objects in synchronism with the motion of said transfer chains; fixed abutment means adapted to cooperate with said actuating means, and power means for driving said sprocket chains, said further conveyor and said transfer chains at a constant and continuous speed.

2. A machine according to claim 1 wherein each one of said gripping heads comprises spring means provided to move said plates away from each other, a rotatable locking device provided to move said plates toward each other, a rod secured to said rotatable locking device and carrying a plurality of radially extending pins adapted to engage said fixed abutment means, whereby the resilient grippers disposed between said plates are caused to grip or to release the objects when one of said pins meets said abutment means.

3. A machine according to claim 2 wherein said fixed abutment means registers in substantial vertical relationship with said lower sections of the straight ramp portions.

References Cited by the Examiner
UNITED STATES PATENTS

| | | | |
|---|---|---|---|
| 1,987,336 | 1/35 | Powell | 214—309 X |
| 2,611,493 | 9/52 | Nordquist. | |
| 2,807,125 | 9/57 | George | 214—309 X |
| 2,818,987 | 1/58 | Krupp et al. | 214—309 |
| 2,819,576 | 1/58 | Hendricks et al. | 53—166 |

HUGO O. SCHULZ, *Primary Examiner.*

GERALD M. FORLENZA, *Examiner.*